F. A. STEVENS.
FRAMELESS SPECTACLES.
APPLICATION FILED OCT. 11, 1909.
953,304.
Patented Mar. 29, 1910.
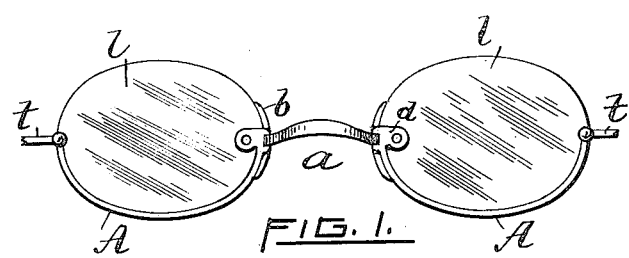
FIG. 1.
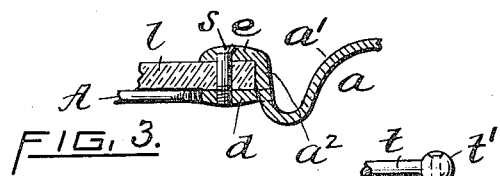
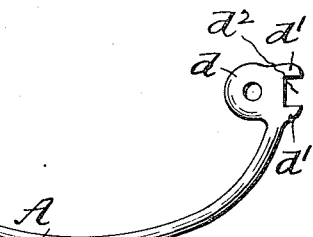
FIG. 4.
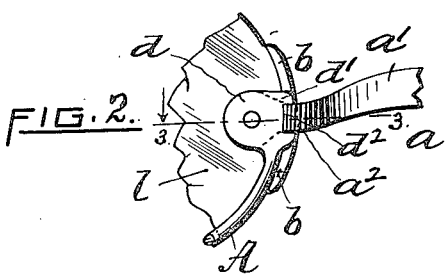
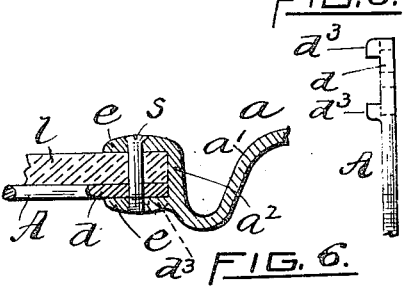
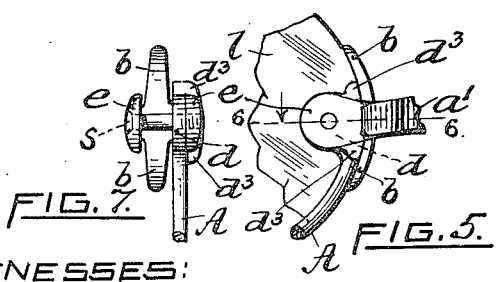
WITNESSES:
C. J. Hannigan.
Eva Lavoie.
INVENTOR:
Frederick A. Stevens,
By Geo. H. Remington.
Atty.

UNITED STATES PATENT OFFICE.

FREDERICK A. STEVENS, OF PROVIDENCE, RHODE ISLAND.

FRAMELESS SPECTACLES.

953,304.  Specification of Letters Patent.  Patented Mar. 29, 1910.

Application filed October 11, 1909. Serial No. 522,114.

*To all whom it may concern:*

Be it known that I, FREDERICK A. STEVENS, a citizen of the United States, residing at Providence, in the county of Providence and State of Rhode Island, have invented certain new and useful Improvements in Frameless Spectacles, of which the following is a specification.

The invention forming the subject of this application for patent relates to improvements in spectacles of the so-called frameless type, wherein the pair of lenses are removably mounted in a nose-piece provided with a central tie or bridge, and it consists essentially of a pair of suitably bent, oppositely disposed connecting members of novel construction, adapted to be detachably secured to the lenses, each bent member being adapted to have a temple-bow jointed to its outer or free end, all as hereinafter set forth and claimed.

The object of the present invention is to provide frameless spectacles with inexpensive temple-bow holders or connections, the same being devised so as to be quickly, easily, accurately and securely positioned with relation to lenses and nose-pieces as usually constructed. By means of this improvement the cost of equipping spectacles with holders or connections of this general character is materially reduced.

It may be stated here that the said bent connections are preferably located at the back of and immediately contiguous to the lenses and adapted to be detachably secured thereto, the curvature or form of each bent member being substantially the same as the contour of the adjacent edge portion of the lens. In lieu of securing the temple-bows directly to the outer ends of the lenses, as is usual in frameless spectacles, they are jointed to the corresponding outer ends of the said connection members.

In the accompanying sheet of drawings Figure 1 represents a side elevation of spectacles (viewed from the back) provided with the improved connections, portions of the temple-bows being omitted. Fig. 2 is a similar view in enlarged scale, but showing only a portion of the nose-piece and the adjacent part of the lens, and also showing the manner of detachably securing the bent connection member to the lens. Fig. 3 is a corresponding horizontal sectional view, taken on line 3 3 of Fig. 2. Fig. 4 represents, in enlarged scale, one of the connection members or temple-bow holders detached. Fig. 5 is a view, similar to Fig. 2, showing a slightly modified form of construction. Fig. 6 is a corresponding horizontal sectional view, taken on line 6 6 of Fig. 5. Fig. 7 represents an edge or end view corresponding with Fig. 5, the lens being omitted; and Fig. 8 is a similar view of the connection member detached, as viewed from the right of Fig. 5.

The nose-piece $a$ as a whole is represented as being provided at each end thereof with one or more straps or ears, $e$; oppositely disposed curved arms $b$, and shank part $a^2$, the latter being united to the bent tie or bridge proper, $a^1$, all substantially as usual. Nose-pieces are usually constructed so as to receive between the ears thereof lenses having a certain thickness or depth. As thus devised, a number or series of lenses varying from one another in thickness would require for mounting them a like number of nose-pieces having correspondingly varying spaces between the ears for the insertion of the lenses.

In the present invention the bent connection or member A is constructed and adapted to be readily positioned with respect to the lens $l$ and nose-piece $a$, while at the same time being secured to the lens and practically interlocking with the nose-piece, thereby, in coöperation with the lens-screw $s$, serving to maintain the several parts in position.

The member A is represented as formed from a piece of wire having a suitable shape cross-sectionally, its body portion being bent to conform closely to the shape of the adjacent outer edge of the lens, as indicated in Fig. 1. The inner end portion of said member is enlarged so as to provide a substantially flat, thin head, $d$, adapted in use to register with the integral ear or ears $e$ of the nose-piece and also to lie flatwise snugly against the rear side of the lens. In Figs. 1 to 4 the said head portion is represented as having an open transverse notch or recess, $d^2$, formed between the upper and lower lugs $d^1$, shaped to receive therein the adjacent shank part $a^2$ of the nose-piece. The head or end is tapped and constitutes a laterally movable ear, which, in coöperation with the fixed ear $e$ and screw $s$, renders the device readily adaptable to lenses varying in thickness; the screw being employed for firmly securing or clamping the member A to the lens. The outer free end $t^1$ of the bent connection is arranged to have a temple-bow jointed thereto. The drawing shows only the corresponding or joint portion of the bow.

The invention is also well adapted to be employed in coöperation with a nose-piece having a pair of integral laterally separated ears, $e$, wherein the distance between them is materially greater than the thickness of the lens itself, substantially as shown in Figs. 5, 6, and 7. In this case the head portion, $d$, of the member A is provided with short upper and lower lugs, $d^3$, extending laterally therefrom in front and being in engagement with the adjacent part of the strap or ear $e$; the construction of the head being substantially the same as shown in Fig. 4, except that the lugs lie in a different plane. See also Fig. 8. The combined thickness of the lens and head $d$ may just equal the distance between the adjacent faces of the ears $e$, the whole being removably yet rigidly secured together by a screw, $s$, as clearly shown in Fig. 6.

It is obvious that the members A may, if desired, be located at the upper side of the lens by simply reversing and resecuring them in position.

I claim as my invention:

1. A connection or temple-bow holder for frameless eye glasses, comprising a curved body portion, a flat head portion, and inter-spaced lugs upon the head portion.

2. In frameless-spectacles, the combination with the lens, of a nose-piece provided with an integral ear resting against the face of the lens, an independent bent connection member provided with a head portion resting against the other face of the lens, lugs upon the head portion engaging the nose-piece, a screw connecting the ear and head portions to the lens, and a temple-bow jointed to the connection member.

3. In frameless spectacles, the combination of a nose-piece member provided with a strap, a bent connection having a portion thereof interlocking therewith, a lens having said connection removably secured thereto, means for maintaining the said parts in their normal relation and position, and a temple-bow jointed to the said bent member.

4. In frameless spectacles, a nose-piece having an ear integral therewith, an independent, laterally movable member or connection having the head portion thereof engageable with the nosepiece and constituting a companion ear, thereby providing therebetween a lateral space adapted to lenses varying in thickness, means coöperating with said members for removably securing a lens in position between the said integral ear and movable connection, and a temple-bow jointed to the outer or free end of the latter.

5. In frameless spectacles, a nose-piece provided at each end with a pair of laterally separated, perforated ears and a bent arm located therebetween adapted, when in use, to engage the adjacent edge of the lens, a bent connection member having an enlarged head part disposed between the ears and held flatwise against the lens, a screw or bolt passing transversely through said ears, lens and head part for firmly securing or clamping the whole together, and a temple-bow jointed to the outer or free end of said bent connection.

In testimony whereof I have affixed my signature in presence of two witnesses.

FREDERICK A. STEVENS.

Witnesses:
GEO. H. REMINGTON,
HENRY P. STONE.